United States Patent
Kimura

[11] Patent Number: 5,889,767
[45] Date of Patent: Mar. 30, 1999

[54] TIME-DIVISION MULTIDIRECTIONAL MULTIPLEX COMMUNICATION SYSTEM CAPABLE OF USING MESSAGE AREA IN RADIO BURST SIGNALS DIVIDED INTO A PLURALITY OF AREAS

[75] Inventor: Atsushi Kimura, Tokyo, Japan

[73] Assignee: NEC Corporation, Tokyo, Japan

[21] Appl. No.: 954,089

[22] Filed: Oct. 20, 1997

Related U.S. Application Data

[63] Continuation of Ser. No. 520,556, Aug. 28, 1995, abandoned.

[30] Foreign Application Priority Data

Aug. 29, 1994 [JP] Japan .................................. 6-203992

[51] Int. Cl.$^6$ ..................................................... H04J 3/16
[52] U.S. Cl. ......................... 370/314; 370/472; 370/538; 370/528
[58] Field of Search .................................. 370/314, 321, 370/326, 329, 330, 336, 337, 345, 347, 442, 472, 477, 538, 540, 468, 522, 528, 465, 433

[56] References Cited

U.S. PATENT DOCUMENTS

| | | | |
|---|---|---|---|
| 4,586,177 | 4/1986 | Kaul | 370/95.3 |
| 4,864,562 | 9/1989 | Murakami et al. | 370/84 |
| 4,987,570 | 1/1991 | Almond et al. | 370/540 |
| 5,170,395 | 12/1992 | Shinmyo | 370/95.3 |
| 5,229,992 | 7/1993 | Jurkevich et al. | 370/82 |
| 5,251,217 | 10/1993 | Traver et al. | 370/84 |
| 5,369,637 | 11/1994 | Richardson et al. | 370/84 |
| 5,412,650 | 5/1995 | Davies | 370/95.3 |

FOREIGN PATENT DOCUMENTS 1-272332 10/1989 Japan .
2-203632 8/1990 Japan .

*Primary Examiner*—Chau Nguyen
*Attorney, Agent, or Firm*—Sughrue, Mion, Zinn, Macpeak & Seas, PLLC

[57] ABSTRACT

A master station and at least one slave station are connected by radio channels. Each slave station transmits data to the master station by time division multiple access. A first circuit equally divides a prescribed area into at least two sub-areas. The prescribed are is defined in a burst signal for transmitting data from each slave station to the master station, the prescribed area being provided for an arrangement of message signals which are sent from at least one terminal connected to the slave station. The first circuit also arranges a message signal in each sub-area. A second circuit generates a burst signal in which at least a control signal and a channel quality monitoring signal are arranged. The control signal and the channel quality monitoring signal are generated in the area peripheral to each sub-area in which a message signal is arranged. The prescribed area in the burst signal may be an area corresponding to a data quantity of 64 kbps in transmission speed. The data quantity of the message signal arranged in that area corresponds to data of 32 kbps, 16 kbps or 8 kbps in transmission speed.

6 Claims, 9 Drawing Sheets

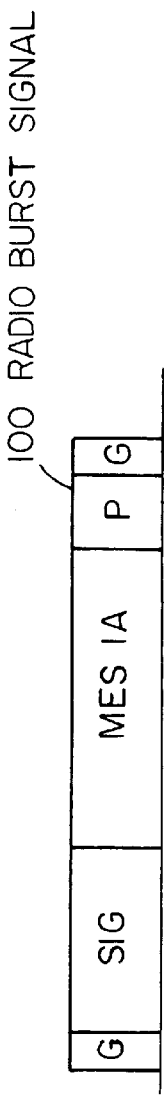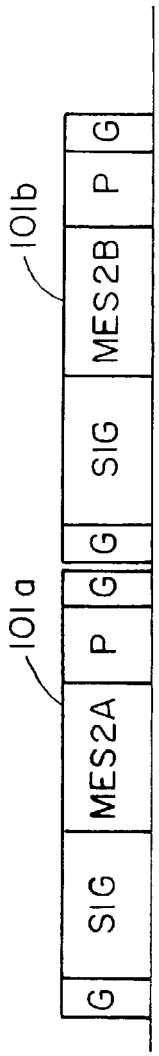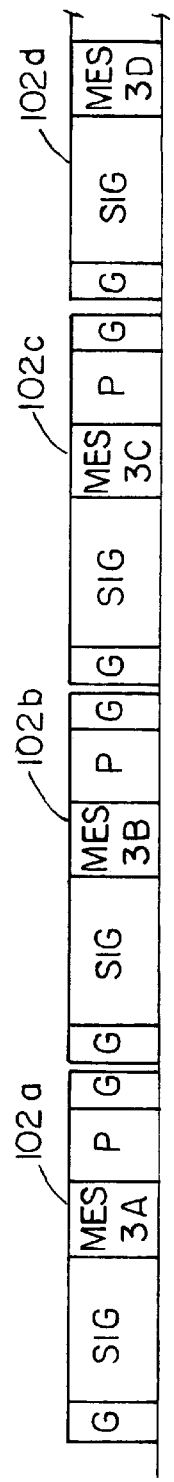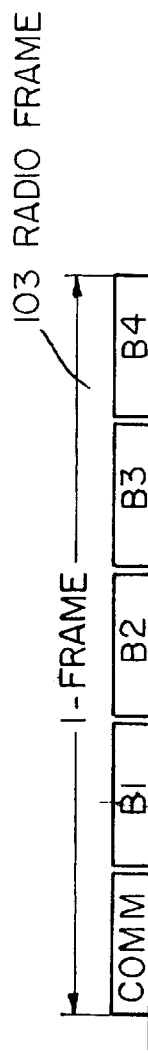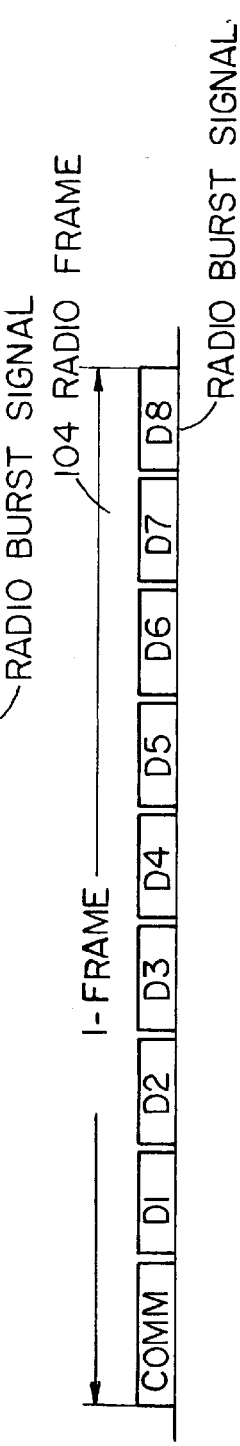

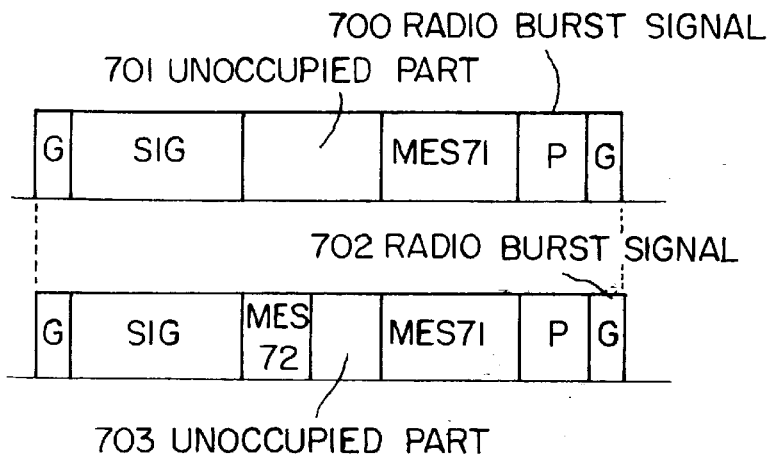
FIG.7A
FIG.7B
700 RADIO BURST SIGNAL
701 UNOCCUPIED PART
702 RADIO BURST SIGNAL
703 UNOCCUPIED PART
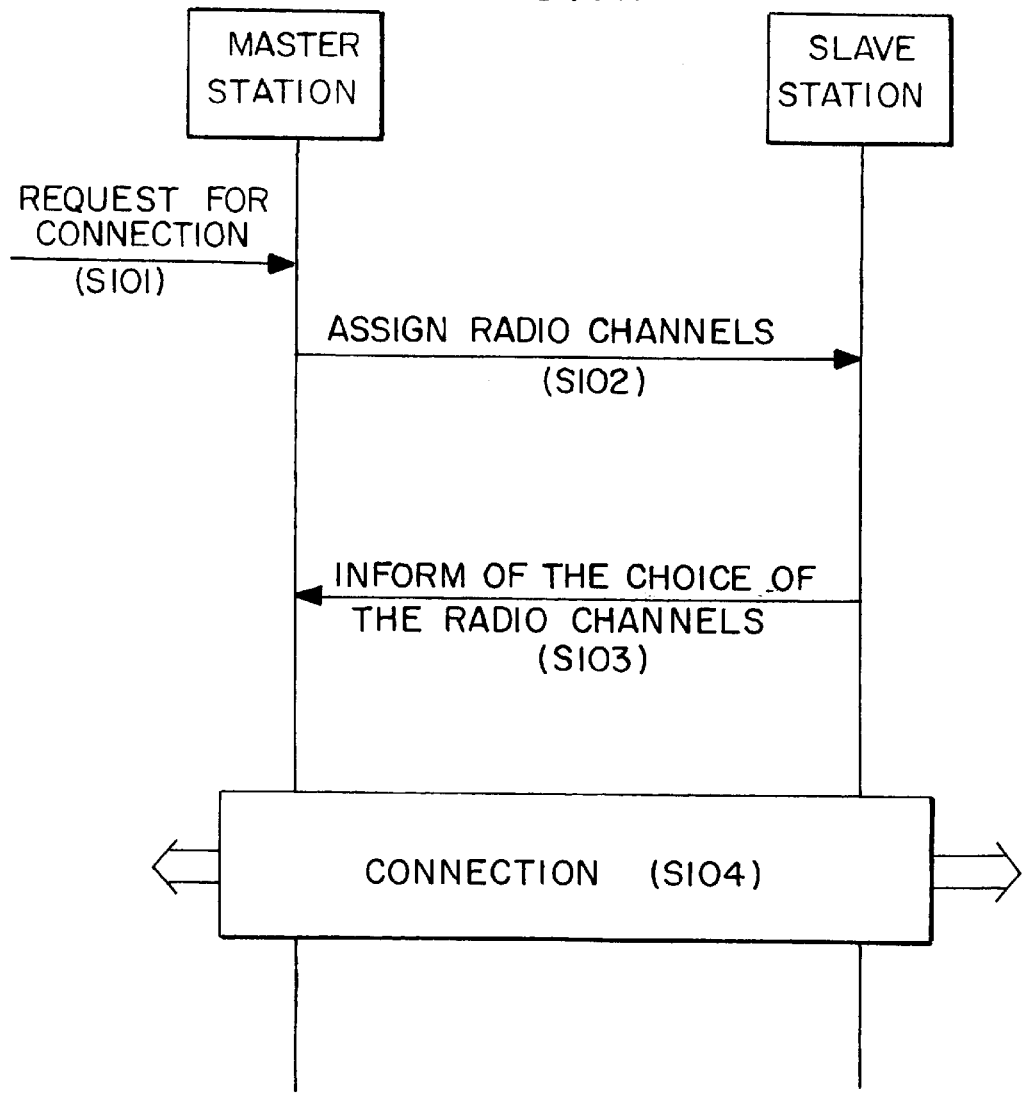
FIG.8A

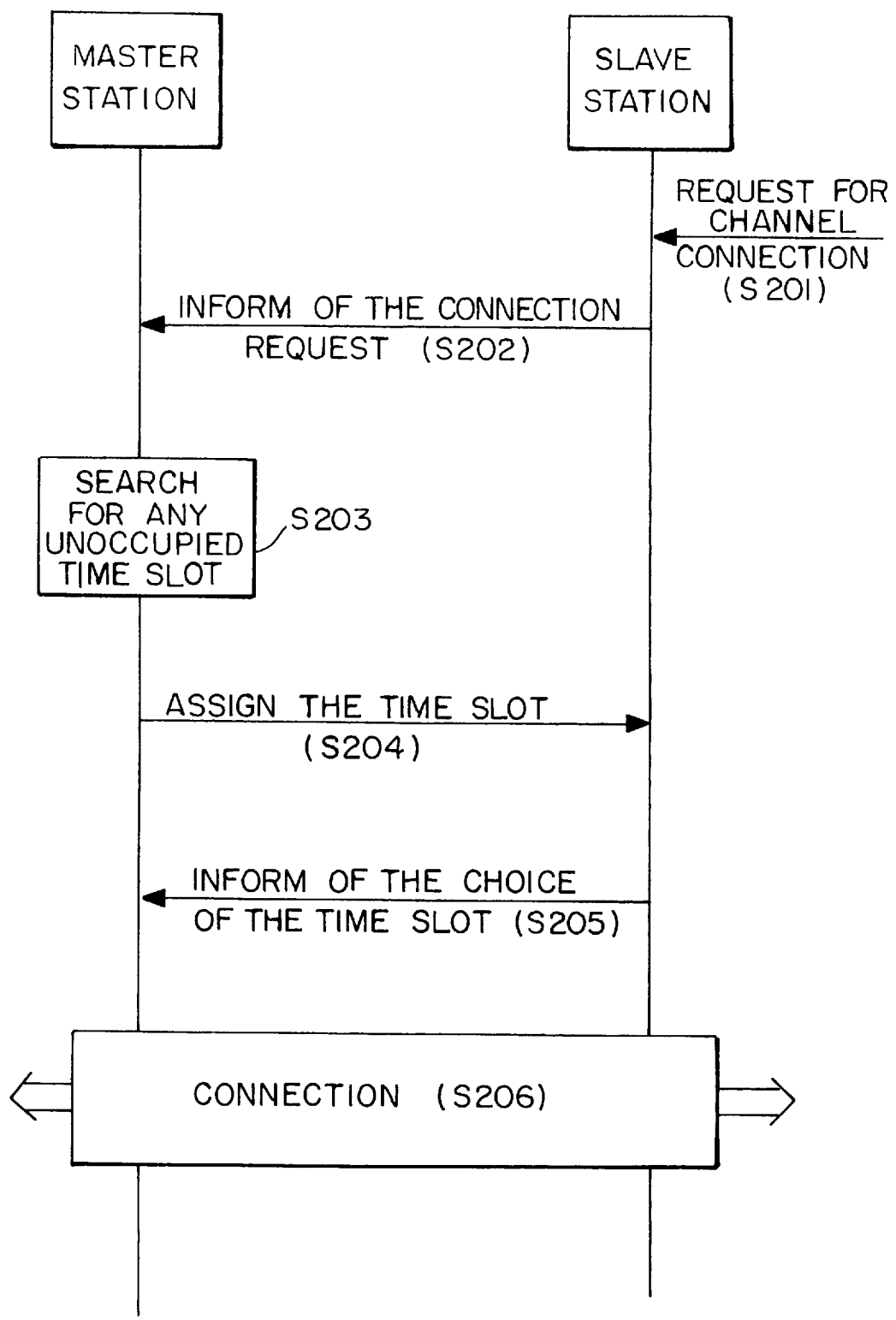

TIME-DIVISION MULTIDIRECTIONAL MULTIPLEX COMMUNICATION SYSTEM CAPABLE OF USING MESSAGE AREA IN RADIO BURST SIGNALS DIVIDED INTO A PLURALITY OF AREAS

This is a continuation of application Ser. No. 08/520,556 filed Aug. 28, 1995 abandoned.

BACKGROUND OF THE INVENTION

1. Field of the Invention

The present invention relates to a communication system wherein one master station transmits data to a plurality of slave stations in a time-division multiplex (TDM) system and each slave station transmits data to the master station in a time-division multiple access (TDMA) system. More particularly, it relates to a communication system wherein, if each slave station is to transmit a message signal of a different data quantity from the data quantity corresponding to a predetermined message area arranged in one radio burst signal in a radio frame, each slave station transmits that message signal without altering the composition of said radio burst signal or that of the radio frame.

2. Description of the Related Art

Instances of the prior art related to the present invention are disclosed in the Gazette of the Japanese Patent Laid-open No. 1990-203632 (Reference 1) and the Gazette of the Japanese Patent Laid-open No. 1989-272332 (Reference 2).

In the TDM system disclosed in said Reference 1, each slave station sets its frame composition such that the data in the slowest transmission speed is transmitted in one time slot of its frame, and this communication system, when communicating data of a fast transmission speed, divides the data, and allocates the divided data to message areas in a plurality of time slots to transmit the data.

The communication system disclosed in this Reference 1 cannot use the format of radio burst signals for the communication of data of 64 kbps, which is the commonly used transmission speed, because data of the slowest transmission speed, for instance data of 32 kbps or 16 kbps in transmission speed, are arranged in a prescribed message area within one radio burst signal.

The Reference 2 discloses a TDM system for communicating data of different transmission speeds, 64 kbps, 32 kbps and 16 kbps, and more particularly to a communication system flexibly adaptable to changes in data transmission speed. More specifically, this communication system concurrently uses one channel consisting of a prescribed number of bits for the communication of data of a fast transmission speed and that of data of a slow transmission speed. The slower the transmission speed of data, the greater the number of invalid bits among the total bits on that one channel, and this communication system multiplexes data by compressing those invalid bits.

The communication system disclosed in this Reference 2, because of the presence of those invalid bits, cannot increase the number of subscribers who can be served even if data of a slow transmission speed are communicated.

SUMMARY OF THE INVENTION

An object of the present invention is to provide a time division multidirectional multiplex communication system which makes it possible to divide a message area in one radio burst signal of a frame for time division multiplex connection into two or more areas.

Another object of the invention is to provide a time division multidirectional multiplex communication system which makes it possible to increase the number of subscribers who can be served by reducing a data quantity of message signals without altering the frame length and configuration of radio burst signals.

Still another object of the invention is to provide a time division multidirectional multiplex communication system which makes it possible, without having to alter the frame composition preset for the purpose of communicating data of a prescribed transmission speed, to improve the efficiency of accommodating subscribers to the communication system by having slave stations transmit data of lower speeds than the prescribed transmission speed to the master station.

Yet another object of the invention is to provide a time division multidirectional multiplex communication system which makes it possible to improve the efficiency of allocating radio burst signals by allowing message signals of different transmission speeds to be present in mixture with each other in a prescribed message area in a preset radio burst signal.

In order to achieve the aforementioned objective, in a time division multidirectional multiplex communication system according to the invention, a master station and at least one slave stations are connected by radio channels, and each slave station transmits data to the master station by time division multiple access. First means equally divides a prescribed area, which is defined in a burst signal for use in transmission from each slave station to the master station and intended for arrangement of message signals sent from at least one terminal connected to the slave station, into at least two sub-areas, and arranges a message signal in each sub-area. Second means generates a burst signal, in which at least a control signal and a channel quality monitoring signal are arranged, in the area peripheral to each sub-area in which a message signal is arranged.

The area defined in each generated burst signal is an area so set as to permit data of 64 kbps in transmission speed to be arranged. The data quantity of the message signal arranged in that area corresponds to data of 32 kbps, 16 kbps or 8 kbps in transmission speed.

In the time division multidirectional multiplex communication system according to the present invention, each slave station is provided with signal processing means for converting each of the message signals sent from a plurality terminals connected to the slave station into a digital signal of a first data quantity corresponding to its transmission speed. Each slave station is also provided with multiplexer means for subjecting at least one digital signal to time division multiplexing with a signal of a predetermined second data quantity. Each slave station is further provided with generator means for generating burst signals in which the signal supplied from the multiplexer means is arranged in a prescribed area. In particular, signal processing means is provided for each of the a plurality of terminals connected to each slave station, and converts the message signals sent from the terminals by different coding methods into digital signals of prescribed transmission speeds. The multiplexer means subjects each of the digital signals supplied from the signal processing means to time division multiplexing with a signal of a second data quantity which is equal to an integral multiple of the first data quantity of that digital signal.

BRIEF DESCRIPTION OF THE DRAWINGS

The above-mentioned and other objects, features and advantages of the present invention will become more apparent from the following detailed description when taken in conjunction with the accompanying drawings, wherein:

FIG. 1A is a diagram illustrating the frame format of the radio burst signal for transmitting message signals of 64 kbps in transmission speed from a slave station to the master station;

FIG. 1B is a diagram illustrating the conventional frame format of the radio burst signal for transmitting message signals of 32 kbps in transmission speed from a slave station to the master station;

FIG. 1C is a diagram illustrating the conventional frame format of the radio burst signal for transmitting message signals of 16 kbps in transmission speed from a slave station to the master station;

FIG. 1D is a diagram illustrating the overall composition of a frame accommodating four radio burst signals for transmitting message signals of a prescribed transmission speed;

FIG. 1E is a diagram illustrating the overall composition of a frame accommodating eight radio burst signals for transmitting message signals each having a capacity equal to ½ of the message capacity of one radio burst signal in FIG. 1D;

FIGS. 7A and 7B are diagrams for showing the format of the radio burst signal where message signals of different transmission speeds are allowed to be present in mixture with each other in the message area of one radio burst signal;

FIGS. 8A and 8B are diagrams illustrating the sequence of allocation of the time slots of the radio burst signal.

DETAILED DESCRIPTION

Figure 2:
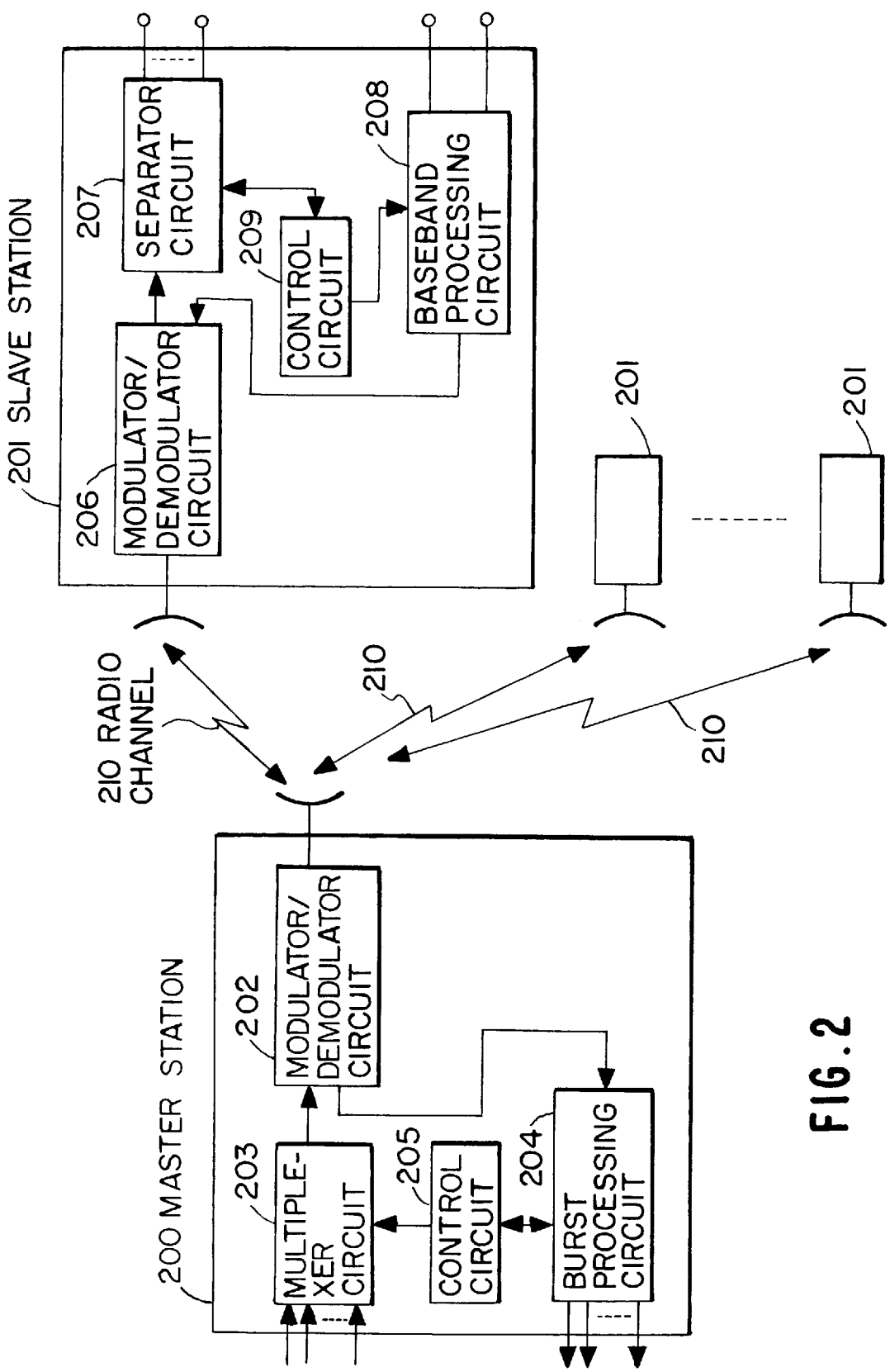
FIG. 2 is a schematic diagram illustrating the configuration of a communication system according to the invention.

Important technical aspects for the description of a time division multidirectional multiple access communication system, which is a preferred embodiment of the present invention, will be first described with reference to FIGS. 1A through 1D.

A radio burst signal is composed for a message signal sent out from each of a plurality of slave stations connected to one master station by radio channels, and transmitted to the master station from the slave stations.

Referring to FIG. 1A, a radio burst signal 100 communicated between a slave station and the master station consists of a number of areas including a guard bit (G) for preventing overlaps between radio burst signals, a control signal slot (SIG), a message (MES1A) sent from a terminal connected to the slave station, and a channel quality monitoring slot (P) for monitoring the channel quality. The format of the radio burst signal 100 illustrated in FIG. 1A is a format for communicating a message signal of 64 kbps in transmission speed.

Next will be described a case in which a message signal of 32 kbps in transmission speed is transmitted from the slave station to the master station. The data quantity in the case of communicating a message signal of 32 kbps in transmission speed is ½ of the data quantity in the case of communicating data of 64 kbps in transmission speed. In a digital communication system according to the prior art, when the data quantity of the message signal is reduced to ½ as shown in FIG. 1B, that message signal is converted into radio burst signals 101a and 101b, which have such time slots as a control signal slot (SIG) and a channel quality monitoring slot (P) added to each of the messages MES 2A and MES 2B. Then, the data quantity obtained by adding that of the message MES2A to that of the message MES2B is equal to that of the message MES1A shown in FIG. 1A. However, the total frame length consisting of the two radio burst signals 101a and 101b becomes different from the total frame length of the radio burst signal obtained by adding the guard bit (G), the control signal slot (SIG) and the channel quality monitoring slot (P) to the aforementioned message signal of 64 kbps in transmission speed.

Also in communicating a message signal of 16 kbps in transmission speed as shown in FIG. 1C, similarly to the above described case, radio burst signals 102a, 102b, 102c and 102d are created, one for each of the messages MES3A, MES3B, MES3C and MES3D whose data quantity are ¼ of the data quantity in the case of communicating data of 64 kbps in transmission speed. Here again, the total frame length consisting of the four radio burst signals, similarly to the above-described case, becomes different from the total frame length of the radio burst signal in the case of the aforementioned message signal of 64 kbps in transmission speed.

A frame 103 consisting of four radio burst signals B1 through B4 are illustrated in FIG. 1D. FIG. 1E shows a frame in the case where the data capacity of the message signal is made ½ of the aforementioned B1 through B4 and the total capacity of data to be communicated is unchanged, i.e. a frame 104 which accommodates eight radio burst signals, D1 through D8 for sending out message signals of a ½ transmission speed with the case of the frame 103. Comparison of the frame 103 and the frame 104 reveals differences in length and composition between them. Thus, even though the transmission speed is reduced to ½, the number of terminals connectable to the slave station cannot be simply doubled. Here, the COMM section in FIGS. 1D and 1E represents a common burst signal with which a control signal common to every terminal is to be multiplexed.

By contrast, in the time division multidirectional multiplex communication system according to the present invention, a radio burst signal is created by multiplexing message signals differing in transmission speed with a transmission speed corresponding to a message area defined in advance in the radio burst signal irrespective of the transmission speed of the message signal sent out from the slave station. As this feature makes it possible for the same frame for time division multiplex communication to be used even if the transmission speed of the message signal is varied, the efficiency of the slave station to accommodate subscribers can be improved by setting the transmission speed of the message signal sent from a terminal connected to the slave station slower than a preset transmission speed.

A time division multidirectional multiplex communication system, which is a preferred embodiment of the invention, will be described below with reference to FIGS. 2 through 4.

At least one slave stations 201 are connected to one master station 200 by a radio channel or channels 210. The master station 200 comprises a modulator/demodulator circuit 202 and a multiplexer circuit 203. The master station 200 further includes a burst processing circuit 204 and a control circuit 205. Detailed description of each circuit will be given in later paragraphs.

On the other hand, each slave station 201 comprises a modulator/demodulator circuit 206 and a separator circuit 207. Each slave station 201 further includes a baseband processing circuit 208 and a control circuit 209. Detailed description of each circuit will be given in later paragraphs.

Figure 3:
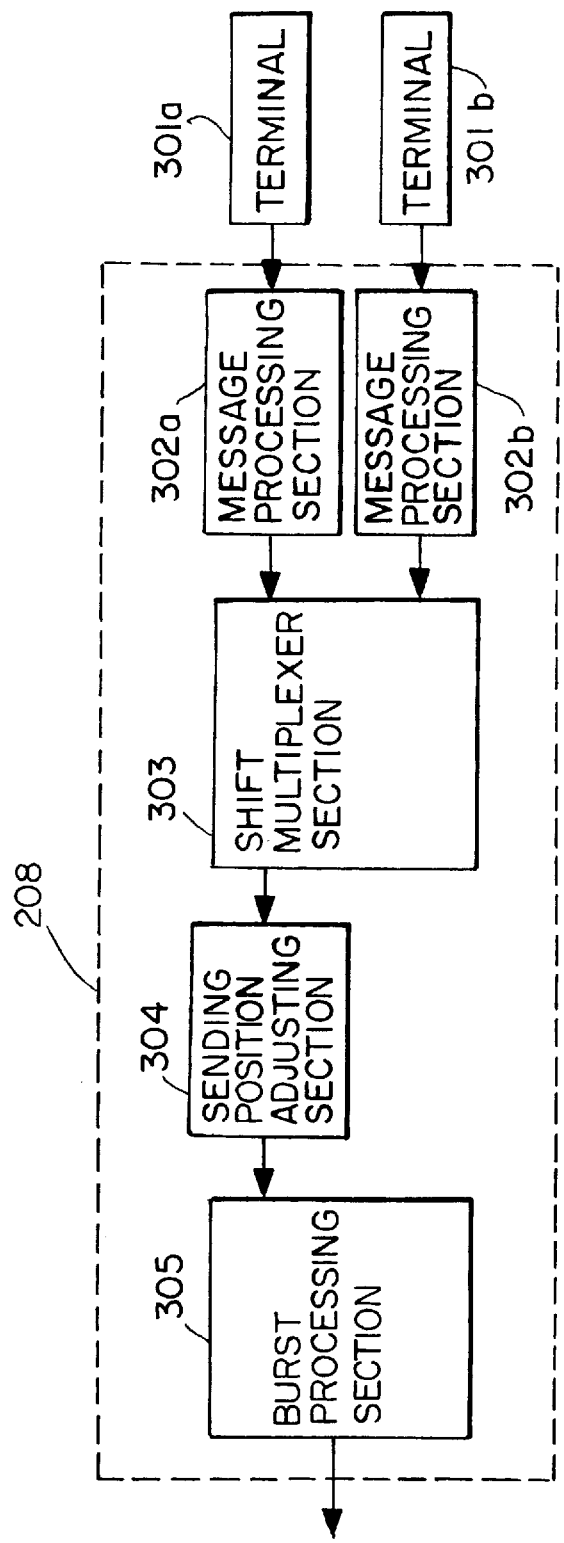
FIG. 3 is a block diagram illustrating the configuration of the baseband processing section in the slave station of FIG. 2.

Referring to FIG. 3, the baseband processing circuit 208 in each slave station 201 is equipped with message processing sections 302*a* and 302*b* for converting a message signal or signals transmitted from terminals 301*a* and 301*b* connected to each slave station 201 into digital signals whose number of bits corresponds to a prescribed transmission speed, and a shift multiplexing section 303 for assembling the digital message signals of a prescribed bit number having undergone signal processing by the message processing sections 302*a* and 302*b* into a signal whose number of bits is α, corresponding to the message area defined in the radio burst signal. The baseband processing circuit 208 is further provided with a sending position adjusting section 304 for adjusting, in order to send the message signal assembled by the shift multiplexing section 303 to a time slot of the radio burst signal as designated by the master station 200, the sending time of that message signal, and a burst processing section 305 for creating a radio burst signal in whose message area (MES) was arranged the message signal of α in bit number.

When the aforementioned bit number corresponding to the message area defined in the radio burst signal is α, the number of bits corresponding to the message signal sent out from the terminal 301*a* or 301*b* is α, α/2 or α/4. For instance, if the number of bits corresponding to the message area is the number of 64 kbps in transmission speed, the number of bits corresponding to the message signal sent out from the terminal 301*a* or 301*b* is so composed as to match the transmission speed of 64 kbps, 32 kbps or 16 kbps.

The message signals of speech information or the like sent out from the terminals 301*a* and 302 are converted by the message processing sections 302*a* and 302*b* into sequences of digital signals, which are supplied to the shift multiplexing section 303. The shift multiplexing section 303 supplies the burst processing section 304 with the sequences of digital signals supplied from the message processing sections 302*a* and 302*b* as they are if their transmission capacity of the message signal is 64 kbps. Or if the transmission speed of the sequences of digital signals supplied from the message processing sections 302*a* and 302*b* is 32 kbps, the shift multiplexing section 303 multiplexes two message signals of 32 kbps in transmission speed into a signal of 64 kbps, which is supplied to the sending position adjusting section 304. However, if the transmission speed of the sequences of digital signals supplied from the message processing sections 302*a* and 302*b* are 16 kbps, the shift multiplexing section 303 multiplexes four message signals of 16 kbps in transmission speed into a signal of 64 kbps, which is supplied to the sending position adjusting section 304. The sending position adjusting section 304, in order to send a radio burst signal for transmitting the digital message signal supplied from the shift multiplexing section 303 to a prescribed time slot, adjusts the sending time of the digital message signal. The burst processing section 305 arranges the message signal supplied from the sending time adjusting section 304 in the message area (MES) of the radio burst signal, and completes the radio burst signal by adding a guard bit (G), a control signal slot (SIG) and a line quality circuit slot (P) around the message area (MES).

Figure 4A:
FIG. 4A is a diagram illustrating the format of the radio burst signal for transmitting message signals of 64 kbps in transmission speed from a slave station to the master station.
Figure 4B:
FIG. 4B is a diagram illustrating the format of the radio burst signal obtained by equally bisecting the message area in the radio burst signal in FIG. 4A to transmit message signals of 32 kbps in transmission speed from a slave station to the master station.
Figure 4C:
FIG. 4C is a diagram illustrating the format of the radio burst signal obtained by equally quadrisecting the message area in the radio burst signal in FIG. 4A to transmit message signals of 16 kbps in transmission speed from a slave station to the master station.
Figure 4D:
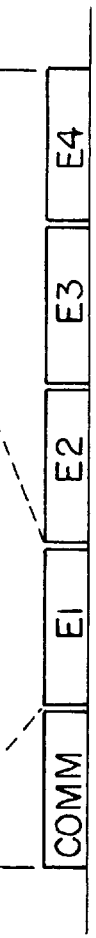
FIG. 4D is a diagram illustrating the format of the whole frame consisting of the radio burst signals from FIGS. 4A through 4C.

FIG. 4A illustrates the format of a radio burst signal 401 formed from a digital message signal (MES4A) whose number of bits corresponds to a transmission speed of 64 kbps. FIG. 4B shows the format of a radio burst signal 402 formed by multiplexing two digital message signals (MES 5A and 5B) whose number of bits corresponds to a transmission speed of 32 kbps to convert them into a message signal whose number of bits corresponds to a transmission speed of 64 kbps. FIG. 4C illustrates the format of a radio burst signal 403 formed by multiplexing four digital message signals (MES 6A, 6B, 6C and 6D) whose number of bits corresponds to a transmission speed of 16 kbps to convert them into a message signal whose number of bits corresponds to a transmission speed of 64 kbps. It is seen from FIGS. 4A, 4B and 4C that the radio burst signals 401, 402 and 403 are equal in burst length. Therefore, as shown in FIG. 4D, even if the number of bits (data quantity) of a message signal changes, the burst lengths of individual radio burst signals does not change, and accordingly the overall format composition of a frame does not change. In other words, even if the transmission speed of a message signal changes, the message signal can be transmitted by using the same frame all the time. The COMM part in FIG. 4D is the part where the control signals and others common to all the slave stations are multiplexed.

Therefore, by reducing the number of bits corresponding to the transmission speed of the message signal sent out from a terminal to ½ (or ¼) of the number of bits corresponding to a predetermined message area in the radio burst signal, the number of subscriber terminals can be increased twofold (or fourfold). Thus, the communication system according to the present invention can improve the efficiency of accommodating subscribers.

Figure 5:
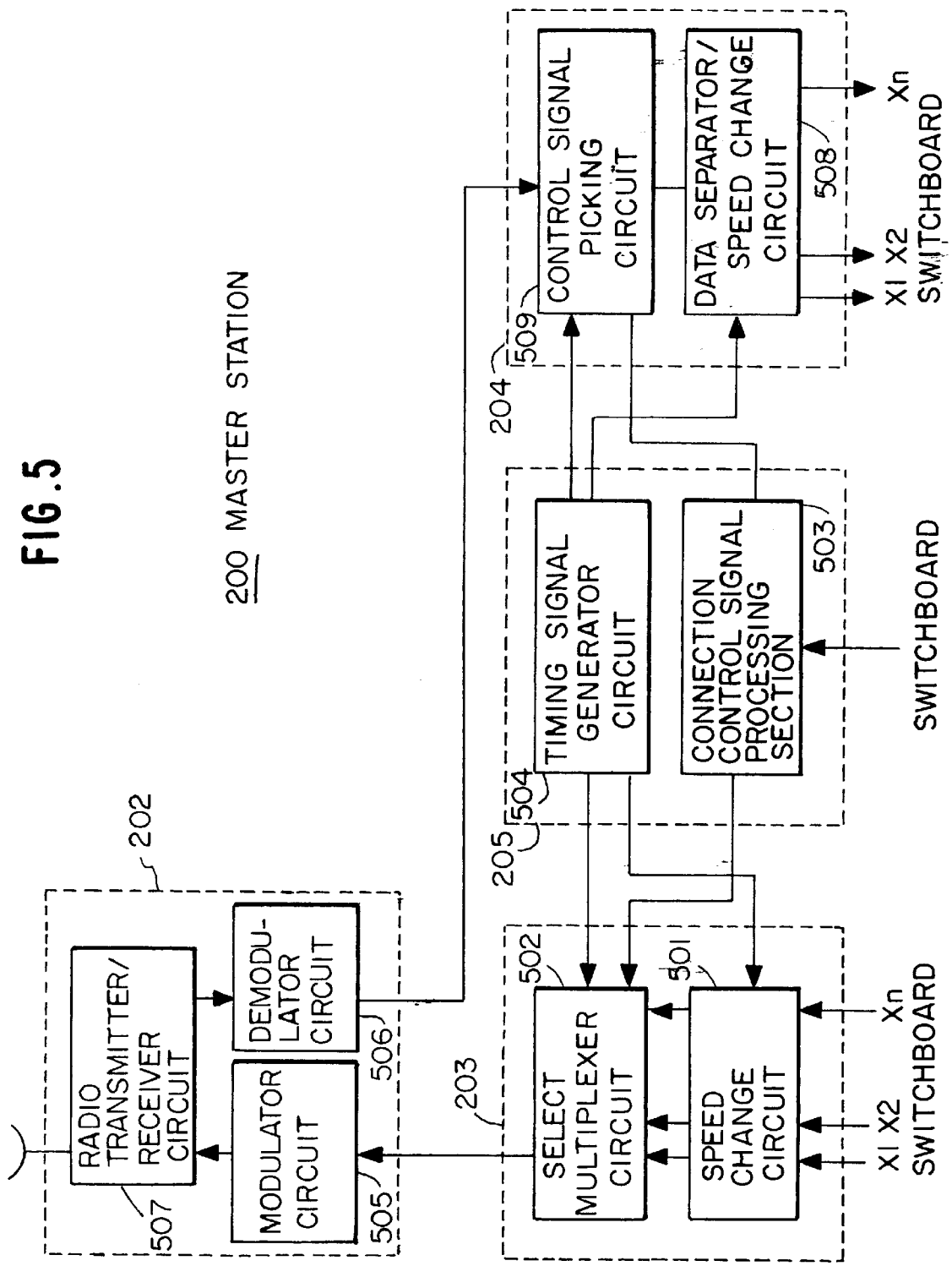
FIG. 5 is a block diagram illustrating the configuration of the master station according to the invention.
Figure 6:
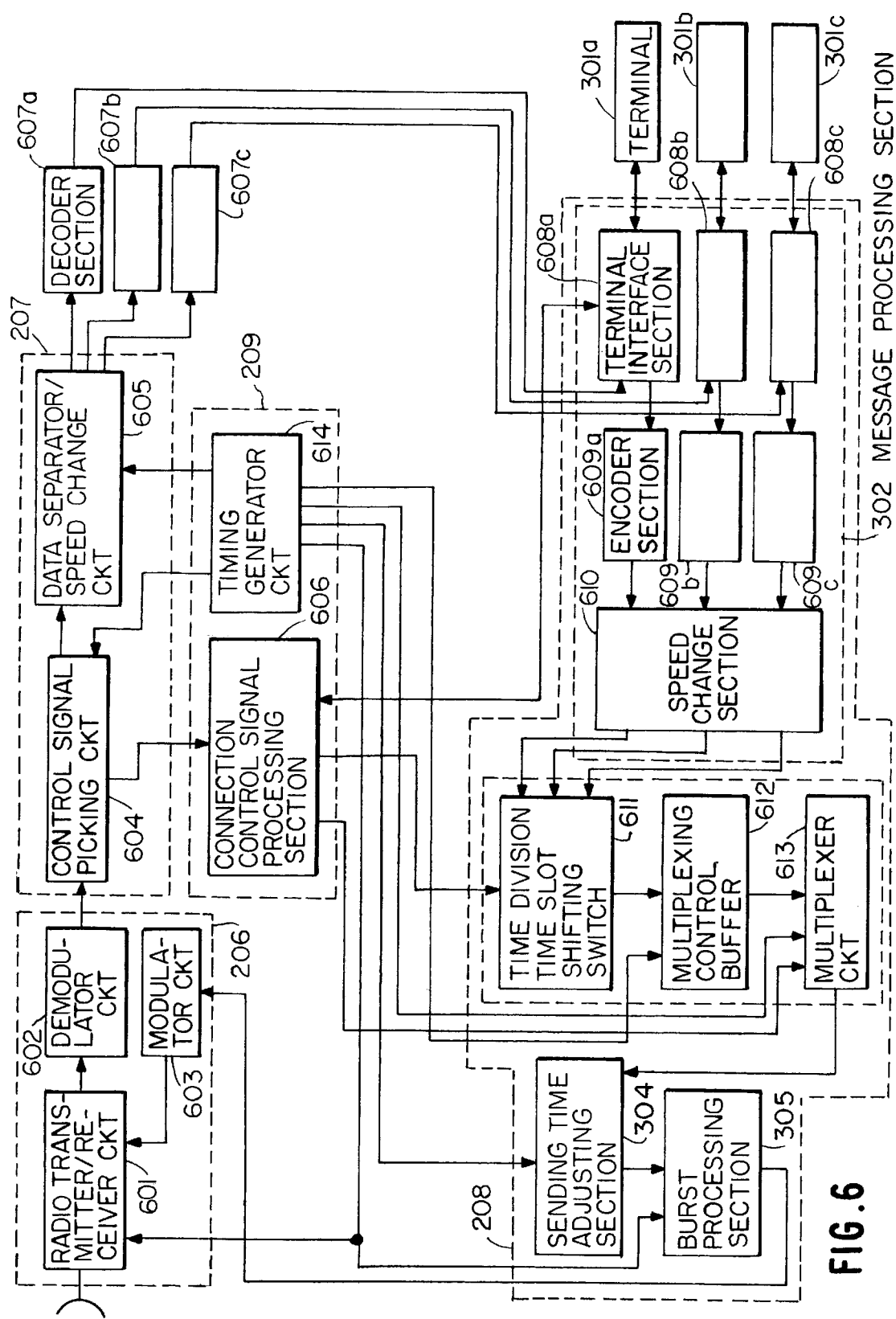
FIG. 6 is a block diagram illustrating the configuration of a slave station according to the invention.

Now will be described in further detail the time division multidirectional multiplex communication system with reference of FIGS. 5 and 6.

First will be described the procedure of communication of downlink signals transmitted from the master station 200 to slave stations 201. The multiplexer circuit 203 of the master station 200 is provided with a speed change circuit 501 and a select multiplexing circuit 502. The speed change circuit 501 changes the transmission speeds of signals sent out from each terminal through a switchboard (not shown) to a transmission speed capable of multiplexing with a radio frame. The signals whose transmission speeds have been changed by the speed change circuit 501 undergo multiplexing, by the select multiplexing circuit 502, with the COMM part in which a frame pattern for radio frame synchronization, a signal for time slot matching control and the like are multiplexed. Here it is supposed that this downlink radio frame uses the same signal sequence as the uplink radio frame shown in FIG. 4D referred to earlier. Control information relating to channel connection requests (hereinafter referred to as call connection control signal) is supplied from the switchboard to the select multiplexing circuit 502 via a connection control signal processing section 503 within the control circuit 205, and multiplexed with the COMM part of the radio frame in the same manner as described above. The timing signals for the processing of the transmission speed change of signals by the speed change circuit 501 and for the multiplexing by the select multiplexing circuit 502 are generated by a timing signal generating circuit 504 in the control circuit 205 and supplied to the respective circuits.

The signal supplied from the select multiplexing circuit 502 is modulated by a modulator circuit 505, and the modulated signal is radiated multidirectionally from a radio transmitter/receiver circuit 507 in a prescribed radio frequency toward the slave stations 201.

On the other hand, each of the slave stations 201 receives the signal transmitted from the master station 200 with its radio transmitter/receiver circuit 601. The received signal is demodulated by a demodulator circuit 602, and supplied to the separator circuit 207 as a baseband signal. The separator circuit 207 comprises a control signal picking circuit 604 and a data separator/ speed change circuit 605. The control signal picking circuit 604 picks out the call connection control signal multiplexed with the COMM part of the downlink radio frame, and supplies that call connection control signal to a connection control signal processing section 606 in the control circuit 209. This call connection control signal is analyzed by the connection control signal processing section 606. Information of the time slot (channel) assigned to the slave station 201 is contained in this call connection control signal, and communicated from the master station 200 to the slave station 201.

The data signal, after the call signal picking circuit 604 has picked out the call connection control signal from the signal transmitted from the master station 200, is supplied to the data separator/speed change circuit 605, where the data signal is further separated into signals for the terminals 301a, 301b and 301c connected to the slave station 201, and the transmission speeds of the separated signals are converted into transmission speeds matching the terminals 301a, 301b and 301c. The signals whose speeds have been changed are decoded by decoder sections 607a, 607b and 607c, provided for the terminals 301a, 301b and 301c, respectively. The decoded signals are respectively converted by terminal interface sections 608a, 608b and 608c into interface signals matching the terminals 301a, 301b and 301c and sent to the respectively corresponding terminals 301a, 301b and 301c. Here, the terminal 301a is supposed to be an analog telephone, the terminal 301b, a digital telephone for transmitting and receiving digital speech signals, and the terminal 301c, a data terminal for transmitting and receiving digital data. It has to be noted, however, that terminals to be connected to the slave station 201 are not limited to those mentioned above.

Next will be described the procedure of communication of uplink signals from the slave stations 201 to the master station 200.

Signals sent out from the terminals 301a, 301b and 301c are sent to encoder sections 609a, 609b and 609c via the terminal interface sections 608a, 608b and 608c, and converted into digital signals (e.g. NRZ codes of 0 to 5 V). For instance, analog speech signals sent out from an analog telephone 301a are subjected to a level change and so forth by the terminal interface section 608a, and further converted into digital signals by speech encoding by the encoder section 609a.

The transmission speeds of the digital signals sent from the encoder sections 609a, 609b and 609c are converted by a speed change section 610 into the same transmission speed suitable for time division multiplexing, and the signals are supplied to a time division time slot shifting switch (hereinafter referred to as shifting switch) 611.

The time division time slot shifting switch 611 is supplied information to assign time slots from the connection control signal processing section 606. The shifting switch 611, in accordance with this time slot assigning information, performs time shift multiplexing of the time slots at which the digital signals sent from the encoder sections 609a, 609b and 609c are to be sent out. A multiplexing control buffer (hereinafter referred to as control buffer) 612 is a memory used for converting consecutive signals into a sequence of intermittent signals matching the radio frame. Thus, in the control buffer 612 are stored the consecutive digital signals supplied from the shifting switch 611, and the stored digital signals are read out at the read timing matching the timing of multiplexing by a multiplexer circuit 613 at the next stage, supplied from a timing generator circuit 614 in the control circuit 209.

The multiplexer circuit 613 multiplexes a signal for the initial adjustment of the sending positions of the call connection control signal and the burst signal from the slave station 201 to the master station 200 with the COMM part of the uplink radio frame. The multiplexer circuit 613 further multiplexes a channel monitoring signal with that COMM part.

The sending time adjusting circuit 304 and the burst processing section 305 perform the already described processing on the output from the multiplexer circuit 613.

The signal outputted from the baseband processing section 208, after being modulated by the modulator circuit 603 by a prescribed method of modulation, is transmitted from the master station 200 via the radio transmitter/receiver circuit 601.

The operational timings of the aforementioned control signal picking circuit 604, data separator/speed change circuit 605, multiplexing control buffer 612, multiplexer circuit 613, sending position adjusting circuit 304, burst processing circuit 305 and radio transmitter/receiver circuit 601 are based on timing signals supplied from the timing generator circuit 614.

A signal transmitted from the slave station 201 to the master station 200 is received by the radio transmitter/ receiver circuit 507 of the master station 200 and demodulated by a demodulator circuit 506. The demodulated signal undergoes separation of a channel connection control signal by a control signal picking circuit 509 in the burst processing section 204 according to a timing signal from the timing signal generator circuit 504. The separated channel connection control signal is analyzed by the connection control signal processing section 503 in the control circuit 205. On the other hand, the message signal separated by the control signal picking circuit 509 undergoes separation by the data separator/speed change circuit 508 into signals for the terminals 301a, 301b and 301c connected to the slave station 201, and their transmission speeds are changed to match the switchboard interface.

Now, with reference to FIG. 6, the message processing section 302 in the baseband processing section 208 will be described in further detail.

At the terminal interface section 608a connected to the analog telephone 301a, signals on a two-wire telephone line are converted into transmit and receive signals for a four-wire line, and other interface processing unique to analog telephones is performed, such as the sending of ringing or the detection of hooking. Furthermore at the terminal interface section 608a, the information having undergone interface processing is deemed call connection. In addition, the terminal interface Section 608a exchanges with the connection control signal processing section 606 in the control circuit 209. The encoder section 609a subjects the speech signal sent out from the analog telephone 301a to various encoding processes to raise the tone quality and minimize transfer information quantity by speech encoding. Such encoding processes include, for example, conversion of speech information from the terminal into a message signal of 64 kbps in transmission speed by using a pulse code modulatrion (PCM) codec complying with Rule A or Rule $\mu$ (ITU-T Recommendation G. 711). However, if the speech information is to be converted into a message signal of 32 kbps in transmission speed, Adaptive Differential PCM (ADPCM) of 32 k (ITU-T Recommendation G. 726) will be applied. Alternatively, if the speech information is to be converted into a message signal of 16 kbps in transmission speed, ADPCM of 16 k or Low Delay Code Exited Linear Predictive (LD-CELP) based on ITU-T Recommendation G. 728 will be applied. In the above-described embodiment of the present invention, as the bit number corresponding to the message area in the radio burst signal is set to be a data capacity of 64 kbps, an encoding employing a particular system of conversion converts the message signal into a signal of ½ of 64 kbps or ¼ of 64 kbps in transmission speed. However, the applicable encoding process is not limited to the aforementioned. By way of example, the encoding system in cellular type mobile communication may be applied to this embodiment if data of 32 kbps and 16 kbps in transmission speed are multiplexed by attaching additional bits. Here, the transmission speed of the encoding system used in digital cellular mobile telephone or the transmission speed when error correction is added would be, for example, 11.2 kbps and 13 kbps in the case of VSELP, 22.8 kbps in the case of REP-LTP, or 5.6 kbps in the case of PSI-SELP. Incidentally, the applicable encoding system and transmission capacity of message signals according to the transmission speed are not limited to the above-cited.

Depending on the encoding system that is applied, it is also possible to transmit speech information at a speed of 8 kbps. In this case, the message area in a radio burst signal is equally divided into eight parts, and it is possible to enter a message signal of 8 kbps in transmission speed into each of the message sub-areas having a ⅛ data capacity.

The terminal 301b connected to the slave station 201 is a digital telephone, and the terminal 301c is a data terminal. The terminal interface sections 608b and 608c subject data sent out from the terminals 301b and 301c to level conversion and other processes. More specifically, the data are subjected to unipolar/bipolar conversion such as AMI and conversions to interface including RS-232, RS-422, V11, RS-449, GP-IB and IEC-IB.

The digital telephone 301b, such as an ISDN telephone, may transmit data as B channel of 64 kbps, entailing no processing by the encoder section 609b. Similarly, signals sent out from the data terminal 301c, as they are already digitalized, often are subjected to no particular processing by the encoder section 609c.

It has to be noted that, comparison with the analog telephone 301a or the like, the transmission speed of signals sent out from the data terminal 301c may be far higher than 64 kbps, such as 192 kbps or 384 kbps. However, in this embodiment of the invention, as the assignment of the time slots according to the transmission speed of message signals is managed by the master station 200, the master station 200 assigns three radio burst signals (time slots) of 64 kbps in transmission speed to the slave station 201 if, for instance, a message signal of 192 kbps in transmission speed is to be transmitted from the slave station 201. In this case, if the communication system has a Demand Assignment Multiple Access (DAMA) function, the instruction of assignment will be even easier.

Next will be described,with reference to FIGS. 7A and 7B, a case in which message signals of a plurality of different transmission speeds are allowed to be present in mixture in a message area defined in a radio burst signal for the transmission of message signals of 64 kbps.

First, as shown in FIG. 7A, a message sub-area MES71 is allocated in a radio burst signal 700 for the transmission of a message signal of 32 kbps in transmission speed from the slave station 201 to the master station 200. If, in this state, a channel connection request for the transmission of a message signal of 16 kbps in transmission speed comes from the same slave station 201 as the slave station for which this radio burst signal 700 is allocated, the master station 200 allocates, to an unoccupied part 701 in the message area of the radio burst signal 700, a message sub-area 72 for the message signal of 16 kbps in transmission speed. FIG. 7B illustrates the composition of a radio burst signal 702 in which the message sub-area MES 72 is allocated for the slave station 201. In this manner, when message signals of a plurality of different transmission speeds are to be transmitted from the same slave station 201, it is possible to allow those message signals of a plurality of different transmission speeds to be present in mixture in a message area defined in a radio burst signal, resulting in a substantial improvement in transmission efficiency.

Next will be described the operation to allocate radio time slots (channels) with reference to FIGS. 8A, 8B and 9.

FIG. 8A illustrates the procedure of channel connection in a call receiving operation. The master station, upon receiving from the switchboard a request for connection to a terminal to be connected to a slave station (S101), assigns at least one radio channels to the slave station by using the COMM part of the radio frame (S102). The slave station, upon receiving the designation of the radio channels from the master station, informs the master station of the choice of the radio channels (S103). The master station, upon being informed by the slave station of the choice of the radio channels, completes the connection between the switchboard and the terminal (S104).

FIG. 8B shows the procedure of channel connection in a call initiating operation. The slave station, upon receiving a channel connection request from a terminal to be connected to it (S201), informs the master station of the connection request by using the COMM part of the radio frame (S202). The master station, upon receiving the connection request from the slave station, searches for a time slot that can be assigned. Thus, the master station searches for any unoccupied time slot in the radio burst signal already assigned to that slave station (S203). Upon finding an unoccupied time slot, the master station gives that slave station an instruction to assign the time slot by using the COMM part (S204). The slave station, being so instructed,informs the master station that it will choose the time slot as the channel of communication thereafter (S205). The master station, upon being informed by the slave station of the choice of the time slot, completes the connection between the switchboard and the terminal (S206).

Figure 9:
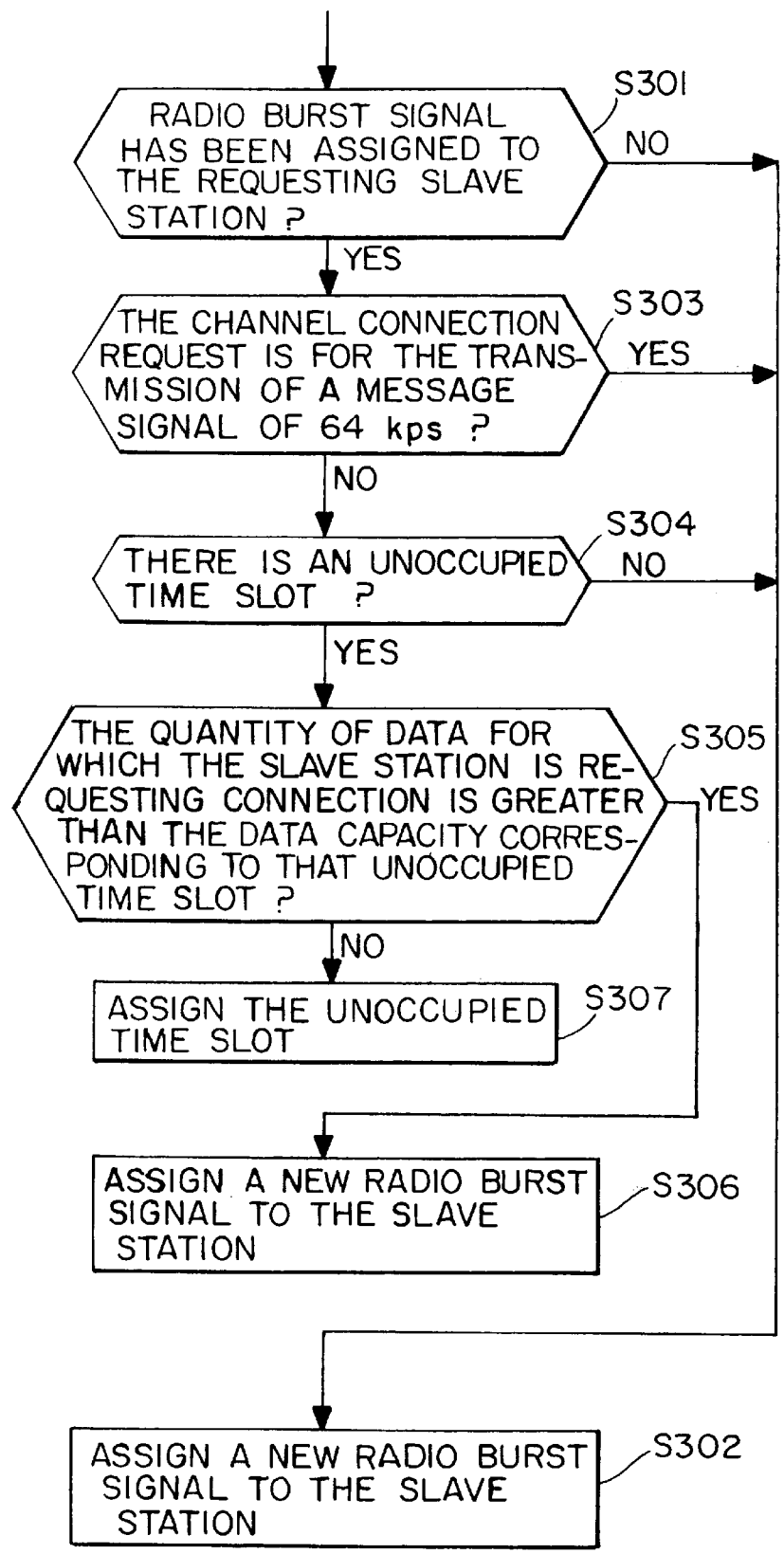
FIG. 9 is a flow chart showing the sequence of allocation by the master station of a new radio burst signal or an unoccupied time slot in an already allocated radio burst signal to a slave station.

FIG. 9 illustrates the procedure of the master station's search for an unoccupied time slot and assignment of the time slot to a slave station. The master station, when a channel connection request is transmitted from the slave station, determines whether or not at least one radio burst signal has been assigned to the requesting slave station (S301). If the slave station is found not to have been assigned a radio burst signal, a radio burst signal is newly assigned to that slave station (S302). On the other hand, if at least one radio burst signal has been assigned to the slave station, the master station determines whether or not the channel connection request from the slave station is for the transmission of a message signal of 64 kbps in transmission speed (S303). If it is for the transmission of a message signal of 64 kbps in transmission speed, a radio burst signal is newly assigned to that slave station (S302). However, if it is not, the master station determines whether or not for the transmission of a message signal of 64 Kbps in transmission speed there is an unoccupied time slot in the radio burst signal already assigned to that slave station (S304). If there is no unoccupied time slot in the already allocated radio burst signal, a radio burst signal is newly assigned to that slave station (S302). However, if there is an unoccupied time slot in the radio burst signal already assigned to that slave station, the master station checks how many kbps of data capacity that unoccupied time slot is for, and determines whether or not the capacity of data for which the slave station is requesting connection is greater than the data capacity corresponding to that unoccupied time slot (S305). If the data capacity for the time slot for which the slave station is requesting connection is greater than the data capacity of the unoccupied time slot, a radio burst signal is newly assigned to the slave station (S306). Alternatively, if the data capacity for which the connection request has been received from the slave station is smaller than the data capacity of the unoccupied time slot, the master station assigns that time slot to the slave station (S307).

The master station manages the state of the use of time slots in radio burst signals in this manner, and assigns, according to the state of occupancy of time slots and the capacity of data for which a slave station has requested connection, either a new radio burst signal or an unoccupied time slot in an already assigned radio burst signal to the slave station. These operations to manage the state of the use of time slot occupancy and to search for unoccupied time slots in radio burst signals are carried out by the connection control signal processing section in the master station (see FIG. 5).

What is claimed is:

1. A time division multidirectional multiplex communication system in which a master station and at least one slave station are connected by radio channels, said at least one slave station transmitting data to said master station using a burst signal, said at least one slave station comprising:
signal processing means for converting each message signal sent from a plurality of terminals connected to said at least one slave station into a digital signal;
multiplexer means for multiplexing a plurality of digital signals output from said signal processing means to produce a multiplexed signal; and
generator means for generating a burst signal which has a message area, a channel quality monitoring area and a control area, said multiplexed signal being arranged in said message area;

wherein said generator means comprises:
detector means for detecting an empty area in said message area, said empty area having a data capacity to accept said multiplexed signal; and
arranging means for arranging said multiplexed signal in said empty area detected by said detector means.

2. A time division multidirectional multiplex communication system, as claimed in claim 1, wherein:

said generator means further comprises:
comparator means for comparing said data capacity of said empty area with a data quantity of said multiplexed signal; and
generator means for generating a new burst signal to transmit said multiplexed signal, when said data capacity of said empty area is smaller than said data quantity of said multiplexed signal.

3. A time division multidirectional multiplex communication method in which a master station and at least one slave station are connected by radio channels, said at least one slave station transmitting data to said master station using a burst signal, said method including the steps of:

converting each message signal sent from a plurality of terminals connected to said at least one slave station into a digital signal;
multiplexing a plurality of digital signals, including said digital signal converted from said message signal, to produce a multiplexed signal; and
generating a burst signal which has a message area, a channel quality monitoring area and a control area, wherein said multiplexed signal is arranged in said message area;

wherein said generating step comprises the steps of:
detecting an empty area in said message area, said empty area having a data capacity to accept said multiplexed signal; and
arranging said multiplexed signal in said empty area.

4. A time division multidirectional multiplex communication method, as claimed in claim 3, wherein said generating step further comprises the steps of:

comparing said data capacity of said empty area with a data quantity of said multiplexed signal; and
generating a new burst signal to transmit said multiplexed signal, when said data capacity of said empty area is smaller than said data quantity of said multiplexed signal.

5. A slave station in a time division multidirectional multiplex communication system in which a master station and at least one slave station are connected by radio channels, said at least one slave station transmitting data to said master station using a burst signal, said at least one slave station comprising:

signal processing means for converting each of message signals sent from a plurality of terminals connected to said at least one slave station into a digital signal;
multiplexer means for multiplexing a plurality of digital signals output from said signal processing means to produce a multiplexed signal; and
generator means for generating a burst signal which has a message area, a channel quality monitoring area and a control area, wherein said multiplexed signal is arranged in said message area;

wherein said generator means further comprises:
  detector means for detecting an empty area in said message area, said empty area having a data capacity to accept said multiplexed signal; and
  arranging means for arranging said multiplexed signal in said empty area detected by said detector means.

6. A slave station, as claimed in claim 5, wherein:
said generator means comprises:
  comparator means for comparing said data capacity of said empty area with a data quantity of said multiplexed signal; and
  generator means for generating a new burst signal to transmit said multiplexed signal, when said data capacity of said empty area is smaller than said data quantity of said multiplexed signal.

\* \* \* \* \*